March 21, 1967 W. E. BURKETT ET AL 3,310,614

METHOD FOR MAKING BURNED CLAY BUILDING PRODUCTS

Filed May 18, 1964 2 Sheets-Sheet 2

INVENTORS
WILLIAM E. BURKETT
PAUL BATCHELDER
BY
Owen, Wickersham & Erickson
ATTORNEYS

United States Patent Office 3,310,614
Patented Mar. 21, 1967

3,310,614
METHOD FOR MAKING BURNED CLAY BUILDING PRODUCTS
William E. Burkett, Martinez, Calif., and Paul Batchelder, Westport, Conn., assignors to Pacific Vegetable Oil Corporation, San Francisco, Calif., a corporation of California
Filed May 18, 1964, Ser. No. 368,282
7 Claims. (Cl. 264—44)

This invention relates to improvements in burned clay building products and to an improved method for their manufacture. More particularly, it relates to strong lightweight bricks and tiles having substantially uniformly distributed and regularly oriented flake-like voids, and to a method for manufacturing them by the stiff mud extrusion process.

The advantages of providing small voids in bricks, tiles, and other burned clay building products have long been known: the weight can be greatly decreased so that transportation costs are considerably reduced, and the costs of handling, shipping, and of all other factors involving weight are diminished. Also, the insulating ability of the bricks, tiles and other such products is greatly increased. It has also long been known that bricks could be made lighter in weight by firing them in such a way that they contained voids, and voids have long been known to result from mixing organic particles, such as sawdust, wood chips, grain hulls, and so on, with the clay, so that when the bricks were fired, the organic material volatilized, leaving a void where the particle was.

However, in spite of these known advantages and of these known ways of producing structures having these advantages, the industry has not adopted these expedients. There have been good reasons. Heretofore, the lightness in weight has been accompanied by an attendant weakness, so that prior-art lightweight bricks, tiles, and other products were often unable to meet structural strength specifications. Also, the prior-art methods left open pores of widely varying sizes, and bricks made by those methods were often unable to pass the water absorption tests. Equally important and perhaps more so, such voids could heretofore be produced only by greatly increasing the manufacturing expenses.

The old methods of manufacturing bricks and structural tiles by hand or with relatively small machine installations, such as individual molds, have largely given way to modern production methods which achieve mass production at low labor costs. The leading method presently in use is the stiff mud extrusion process, which has greatly reduced the cost of manufacturing bricks. In it the clay, shale, or other burnable material from which the brick is made, is mixed with just enough water to be plastic enough for extrusion through a die. Usually about fifteen to twenty-five percent of water is mixed with the clay or shale in a pug mill, and the resultant mud is extruded through a die to produce a column having the cross section substantially that of the brick. The column may be cored or solid. At intervals, the column is cut off, usually by wire cutters, to produce a series of rectangular blocks very nearly the size of the bricks. These blocks are then dried to remove the water, and then the blocks are fired into bricks. Tiles are similarly made.

This stiff mud extrusion process has heretofore been impracticable when void-producing organic particles were added to the clays and shales, chiefly because these materials are very water-absorbent and when they were incorporated, the bricks tended to become swollen or expand out of shape. Many of these materials tended to compress as the column went through a die and then expanded, often irregularly, imparting distortion. Some were stringy and were too long, yet they could not be cut by the wire cutters but instead were pulled out of hte bricks. For all these reasons, there was no adequate control, and the wet green bricks would often expand in such a way that they fell apart before firing or cracked during firing.

As a result of the failure of organic void-producing particles in the stiff-mud extrusion process, it has simply not been possible to make void-containing bricks economically. Some other processes are in use beside the stiff-mud extrusion process, but these, too, have not lent themselves well to the production of lightweight bricks with voids in them.

The problem, then, to which this invention relates is how to adapt the stiff-mud extrusion process to the production of strong lightweight bricks, that is, bricks containing voids and at the same time sufficiently strong to meet the specification standards for building materials. The problem has not been solved heretofore, even though a very wide variety of materials has been tried, including many which are, in themselves, of very low cost, some being a discarded waste or by-product. The low cost of these materials has not made up for their failure to perform well when mixed with clay and used in a modern brick-making process, such as stiff-mud extrusion.

We have solved this problem with the aid of a novel void-producing material, namely, flakes of the hulls of safflower or sunflower seeds, or mixtures of them, and we have obtained particularly good results by using a weak aqueous solution of sodium silicate to make the stiff mud.

We have found that by adding to six to eight parts by volume of clay, shale, or clay-shale mixtures, enough parts by volume of safflower (or sunflower) seed hull flakes to make up ten parts by volume, we are able to achieve a mix which, when water or the weak aqueous sodium silicate solution is added, makes a stiff mud capable of extrusion as readily as current mixes for the stiff-mud process, and which results in a brick that does not unduly expand or is not unduly wet and which achieves the structural strength required.

Other objects and advantages of the invention will appear from the following description of some preferred embodiments thereof.

Figure 1:
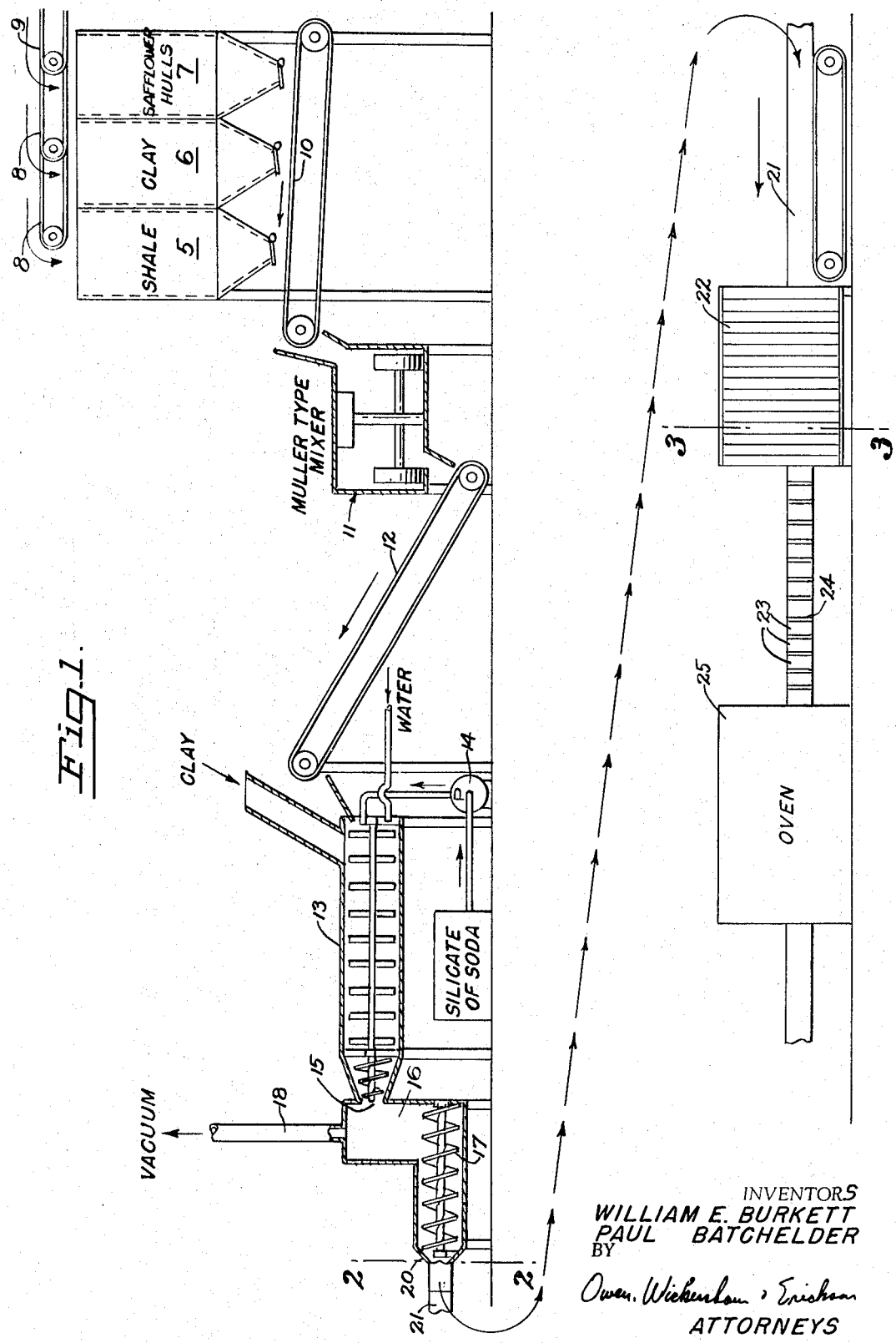
FIG. 1 is a diagrammatic representation of a brick manufacturing line employing the principles of the present invention and applying them to a stiff-mud extrusion process.
Figure 2:
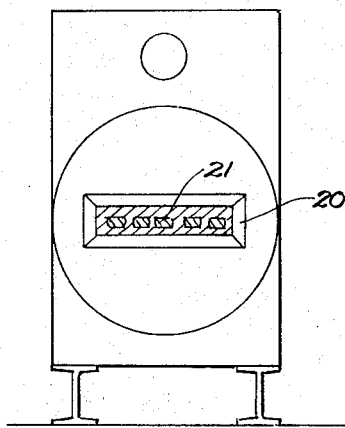
FIG. 2 is a view in section taken along the line 2—2 in FIG. 1.
Figure 3:
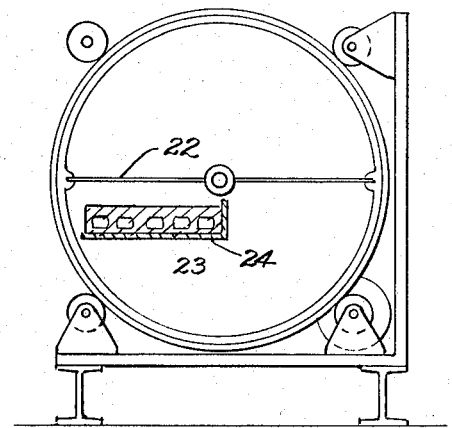
FIG. 3 is a view in section taken along the line 3—3 in FIG. 1.
Figure 4:
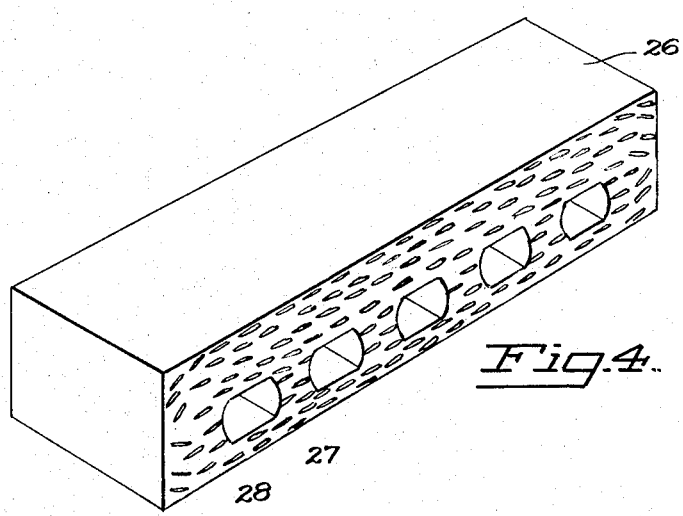
FIG. 4 is a perspective view of a cored brick made according to this invention.
Figure 5:
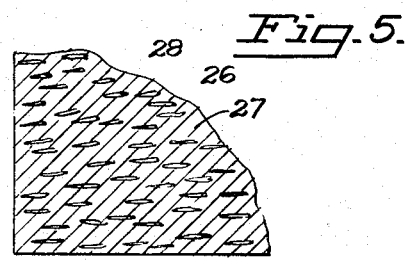
FIG. 5 is a fragmentary view in section of a portion of the brick of FIG. 4.

Safflower seed hull flakes have peculiar properties which enable them to succeed where other particles have failed. Safflower is a well known species of compositae characterized by the very high oil content of its seeds. The seed is grown for its oil, which is typically obtained by cracking open the seeds and expressing the oil, and usually following by solvent extraction of the residue. The broken hulls are then separated from the meal, which is used as animal feed. The hulls originally have a very low oil content, but, as a result of their having been subjected to the expression and solvent extraction, the broken hull flakes are generally coated with an oil film. Moreover, this oil is a drying oil; it tends to polymerize and harden. As a result, these flakes are much less water absorbent than sawdust, wood chips, and other seed hulls.

Typically, these flakes have an oil content of about 1 to 2%, which is substantially confined to the surface, where it dries and effectively acts as a waterproofing agent which greatly reduces the amount of water getting inside the hull flakes and swelling them. This is one of the key factors of this invention. Sunflower seeds are in many ways like safflower seeds and so are the hulls. There are, of course, differences and one may be preferred to the other for this reason, but both are distinct from the other types of aqueous materials heretofore used in bricks.

Water absorbency tests have been made on various materials which seemed likely to give good results. Samples of the materials were soaked in water for an hour, drained for one-half hour, and then the mositure content was determined by weighing them before and after they were dried for two hours at 130° C. in a forced draft oven. Among the materials tested were pine sawdust, pine flakes, cottonseed hulls, cocoa bean hulls, and rice hulls. The results showed that the wet safflower seed hull flakes had a ratio of water to solids of only 1.14 to 1, whereas rice hulls had a ratio of water to solids of 1.82 to 1, cocoa bean hulls had a ratio of 2.06 to 1, cottonseed hulls had a ratio of 2.47 to 1, pine flakes had a ratio of 3.03 to 1, and pine sawdust had a ratio of 6.35 to 1. Sunflower seed hull flakes are about the same as safflower seed hull flakes in this particular quality.

From these data it can be seen that when these other materials are wet in the stiff mud they absorb water readily, so that much more water has to be added and later evaporated off, decreasing the then volume. When these other materials are wet, they necessarily swell considerably. A great deal more water must be added to get a stiff-mud mixture having the same flow characteristics, because the organic material absorbs the water more readily than does the clay. This extra amount of water that has to be put in to make the mud flow in the extrusion process defeated this process when using these materials. The bricks were swollen when they came out of the die, and it became practically impossible to maintain the tolerances needed on the final sizes. Since the columns, if not tight, expanded, since the expansion tended to reduce the strength of the brick by as much as a thousand p.s.i., since the soft columns were easily damaged, and since there was more water to remove so that there was a higher fuel cost and many more cracks and breaks tended to form, all these things acted together to prevent the economical extrusion manufacture of lightweight bricks made by the organic burnout void-producing method.

As shown, safflower hulls have low water absorption. It is possible to take other materials, coat them with water-repellent or drying oil, and decrease their water absorption. However, the oil coating processes generally makes the flakes too expensive, therefore it is generally preferred to use the safflower hull flakes which naturally have this coating as they come.

We have found that flakes in which a majority of the particles were no larger than 6-mesh Tyler screen and no smaller than 35-mesh Tyler screen gave the most satisfactory results. This range can easily be obtained by screening the safflower or sunflower seed hull flakes, and if a large portion of them are too large, they can easily be broken by a quick grinding or crushing operation or in other suitable ways. A typical flake of safflower hull screenings is between 0.01 and 0.02 inch thick, 0.04 and 0.06 inch wide, and 0.6 to 0.1 inch long. The flake may of course vary in thickness along its length and in width along its length. Typically, the perimeter is more or less rectangular in shape with rather curved sides, not polygonal, and smooth rather than jagged.

Since there is some absorption of water by the safflower and sunflower seed hulls and since even this much absorption has significance, we have found that the desired final brick strength can best be obtained, along with the desired uniformity, by using a weak sodium silicate solution instead of water to make the stiff mud. Where the strength specifications are lower, water is all right, but the sodium silicate solution holds the material together more coherently after extrusion and thereby maintains size tolerances better, reducing swelling and column weakness. Also the sodium silicate tends to lubricate the clay as it moves through the extrusion machine and helps to reduce the amount of water needed for this purpose. In addition, we have found that it adds substantially to the strength of the final brick product while costing very little, the cost increase being more than offset by the resultant savings in transportation and handling of the lightweight bricks which can be made.

The stiff-mud process is well known, and the drawings are given principally to show how it is adapted to the present process. There are no substantial changes from the usual process except those which flow from the addition of the safflower or sunflower hull material and the use of sodium silicate solution.

As shown in FIG. 1, there may be three bins, a bin 5 for shale, 6 for clay, and 7 for safflower or sunflower hulls. The shale and clay may be put into their respective bins 5 and 6 by respective conveyors 8 that may carry the material from grinding areas. The safflower hull bin 7 may be filled by a similar conveyor 9 or in bulk.

The safflower hull flakes used are from the processing safflower seed and are a by-product of the production of safflower oil; the safflower seeds are typically broken open, expressed, and solvent extracted; the resultant hull flakes are separated from the meal by any suitable means and preferably are screened to give six to thirty-five mesh Tyler screen size. Preferably, sunflower seed hulls are processed to approximately the same size.

The clay may be any brickmaking clay, and the shale may be any brickmaking shale. The clay and shale are ground to conventional degrees of fineness which do not depend on the use of safflower hull flakes but are the same as those normally used to make bricks. A brick may be made entirely from shale or entirely from clay or from a mixture of the two in any proportion. If desired, conventional binder and other conventional additives may be used.

All of the bins 5, 6 and 7 may be set to deliver a fixed amount per minute on a conveyor 10, at the desired proportional rate. We prefer that from 60 to 80 percent by volume of this solids mixture be shale or clay or mixtures of shale and clay and that the remaining 20 to 40 percent by volume be made up of the safflower or sunflower hull flakes or mixtures of them. The conveyor 10 carries the ingredients to a muller-type mixer 11 or other suitable mixing device. The muller type mixer 11 thoroughly mixes the two or three materials together so as to distribute the safflower or sunflower hull flakes very evenly and thoroughly through the mixture.

The thorough mixture of shale or clay, and safflower hull flakes leaves the muller-type mixer 11 on a conveyor 12 which carries it to a pug mill 13. At the pug mill 13, mud is made by adding water in the amount of about 15 to 25 percent by weight of the solids, the water may be fed in by a metering pump 14. As noted earlier, the water preferably is an aqueous solution of sodium silicate, because that simplifies handling during the extrusion process and makes stronger bricks. The pug mill 13 is typically 10 to 15 feet long, and in it the clay, hull flakes, and water or silicate solution are mixed very thoroughly to produce a stiff mud. Sometimes, two pug mills in series may be used for added mixing.

From the outlet 15 of the pug mill 13, and mud goes into an inlet 16 of an auger 17. At this point, a vacuum line 18 preferably draws off air so that the stiff mud is freed from air bubbles which would produce large unwanted voids. The auger 17 feeds the air-free mud to a die 20 at the outlet of the auger 17, and there the stiff muddy material issues in the form of a column 21. This column 21 may be solid or cored, as desired.

During this passage through the die, the safflower seed hull flakes have, we find, a tendency to line up in a regular pattern, most of them lying substantially flat, that is, in a position parallel to the flow, while at the side edges they are perpendicular thereto for a short distance. This is due to the velocity gradient created by the flow of the plastic mass through the extrusion die. Thus, they are distributed uniformly and in a regular attitude pattern inside the clay column.

In this stiff-mud process the tempered mass of clay materials and safflower seed hulls flows through the die 20 in a laminar type of flow. The walls of the die 20 exert a backward drag on the outermost layer of the plastic mass which in turn tends to drag back the next layer within it and so on. The velocity is at a maximum at the center of the die and decreases to nearly zero at the die walls. This laminar flow causes the flat flakes of safflower seed hulls to be oriented in a very predictable and regular pattern. The flat side of the flake is parallel to and within the lamina and in a direction at right angles to the flow or velocity gradient of the plastic mass within the die.

The column 21 fed from the die 20 has a cross section substantially that of the length of the brick or tile to be made, and the next step is to cut the individual bricks from the column. For this purpose, we prefer to use a conventional wire cutter 22 which comes down at intervals to cut off a series of blocks, from which the brick, tile, or other clay product is to be made. This block 23 is approximately, but not exactly, the size of the finished brick.

From there a conveyor 24 carries the blocks 23 to an oven 25 where they are dried and fired. In drying and firing, all the water that was mixed in must be driven off; hence, the importance of the low water absorption of the safflower and sunflower hull flakes. The sodium silicate remains as a binder, and during firing the sodium silicate tends to make a glass-like strengthening agent for the clay. During firing also, the safflower or sunflower hull flakes and the oil on them which have prevented water absorption are substantially volatilized, leaving a small amount of inorganic ash behind, and leaving the finished brick 26 with a network of isolated cells, which at least for safflower seed hulls are flat and flake-like in form and are substantially uniformly distributed and disposed in a regular attitude pattern. Drying and firing are done at the conventional temperatures, usually around 250° to 450° F. for drying and about 1700° to 2300° F. for firing.

When the brick or tile 26 has been fired, there are, of course, no safflower or sunflower seed hull flakes nor water remaining in the brick. Instead, there is a hard strong structure of clay 27 with a small amount of sodium silicate fused into it and numerous voids 28 which reduce the weight by approximately the 20% to 40% of volume which was occupied by the safflower or sunflower seed hulls. These bricks and tiles, upon test, have been found to be nearly as strong as otherwise identical bricks and tiles made without the hulls and in some cases the finished bricks 26 are stronger than many of the bricks now made without the voids. This applies to both solid bricks and hollow core bricks. At the same time, the bricks 26 are much lighter and therefore are easier to handle and transportation costs substantially less, so that they can be economically sold over a wider area. Furthermore, the isolated cells 28 form spaces which add substantially to the insulation property of the brick. The void-containing bricks 26 have a great deal lower $k$-factor (thermal conductivity) than do bricks without the voids. The fact that the openings 28 are regularly oriented and uniformly distributed helps a great deal in achieving a high insulation value and in reducing thermal shock.

The bricks 26 made by this invention are high in compressive strength, low in water absorption and saturation coefficient, and the tolerances of dimensions and distortion are well maintained, as will be seen from the following examples.

*Example 1*

Clay from a commercial pit in northern California, was mixed with safflower seed hull flakes lying within the 6 to 35 mesh Tyler size range. The solids mixture was 65% clay by volume and 35% hulls by volume. The solids were then mixed in the pug mill with water in the amount of 23% by weight of the weight of the solids. The stiff mud was run through the process and made into 16¾" x 21" oval flue tile. The material was satisfactorily strong, though no quantitative strength tests were made. The tiles weighed 54 pounds each instead of the 73 pounds which normally such tiles weighed. Insulation value was tested by applying a blowtorch flame to one side of the tile and holding a hand on the other side; it felt warm but not hot. When this blowtorch test was done in the shade, the cool side felt cooler than tile left in the sun.

*Example 2*

The solids were 75% shale and 25% of the sized safflower hull flakes, both by volume. To this, 19% of the shale-hull weight was added in a 1% aqueous solution of sodium silicate. The stiff mud was extruded, cut, and then dried for 24 hours at 350°. The dried solid blocks were fired for 24 hours at 1920° F. The samples were very hard with good color, and the resultant 4¼" x 1⁵⁄₁₆" x 2⅛" bricks had smooth texture with some checks from the burnout of the safflower hulls. The compressive strength of the bricks was 2840 pounds per square inch, which exceeded ASTM specifications C-62 MW, C-62 NW, and C-216 MW.

*Example 3*

Cored bricks having a fired size of 8⅜" x 2½" x 3¹⁵⁄₁₆" were made having a solids content, by volume, of 40% of a northern California clay screened to 12 mesh, 30% of a northern California shale screened to 12 mesh, and 30% of the sized safflower hull flakes. A one-half of 1% aqueous solution of sodium silicate was added in the amount of 19% by weight of the total solids weight. The stiff mud was extruded to produce cored blocks that were dried and then fired for 104 hours. Instead of the normal weight of six pounds per brick, the bricks of this example weighed about 4½ pounds, or 25% less. Tests on the cored bricks showed that they had a compressive strength of 3160 p.s.i. A five-hour boil absorption test showed a gain in weight of only 12.87%. In this ASTM test C-62, a brick is first weighed dry, then put under boiling water for five hours, taken out and after dripping, is weighed wet. The gain in weight represents the total pore space occupied by water. If the pores are open to the edges and water can get in, then such bricks are likely to be affected by rain and moisture condensation. If only a portion of the total pore space is occupied by water in this test, there is room for expansion on freezing into the remaining pore space without disruption of the brick. The data indicate that if the excess moisture does not exceed 80% of the total pore space the remaining space will relieve the pressure due to expansion on freezing.

*Example 4*

Some bricks, both cored and uncored, were made from a mixture of 50% northern California clay, 25% Contra Costa County shale, and 25% safflower hull flakes, all by volume. It was put into a pug mill with 23½% by weight of solids in water. The bricks were extruded and fired in the usual manner to produce a compressive strength of 2850 p.s.i. and a water absorption on five-hour boil of 16.4%. The dry weight was about 5¼ pounds per brick before firing. The fired size of the brick was 8⁵⁄₁₆" x 2¼" x 3⅞". Standard bricks weigh 5½ pounds if solid and 5 pounds if cored; the solid bricks of this example weighed 4.2 pounds, and the cored bricks of this example weighed 3.8 pounds.

Example 5

Solid bricks were made from 50% of a northern California clay, 25% of a Contra Costa County shale, and 25% of safflower hull flakes. 24½% of the solids weight was added in water to the pug mill, the bricks were extruded, cut, and fired. The fired size was 8¼" x 2¼" x 3⅞", and the bricks weighed 4.2 pounds. These bricks had a compressive strength of 2000 p.s.i. and a water absorption 5-hour boil of 18.3%.

Example 6

A mixture of fire clay, 70% by volume, 5% of sand, and 25% of safflower hull flakes was mixed with 25% by weight of the solids in water. The material was dried and fired over a total time of 108 hours and had a compressive strength of 1620 p.s.i. and a water 5-hour boil absorption test of 20.0%. The sand appeared to have somewhat weakened the brick and generally speaking has not been found advisable. The bricks weighed 4.3 pounds as against a normal weight for bricks, of the same size, of 5½ pounds.

Example 7

In another mixture 60% by volume of fire clay, 10% sand, and 30% safflower hulls was used. By using a water content of 26% and drying and firing time of 108 hours, a 4.1 pound (normal weight 5½ pound) brick was produced having a compressive strength of 1490 p.s.i. and water absorption on 5-hour boil of 20.4%. The addition of the sand again appeared to weaken the brick; so the use of sand is not generally advisable.

Example 8

Using northern California shale, 70% by volume, and sunflower seed hulls, preferably broken and graded by screens, 30% by volume, a mix similar to some of those above can be made. A two percent solution of sodium silicate is preferably added in the amount of 22% by weight of the shale-hull mixture. Firing is as before with similar results. If desired, the hull flakes may be mixtures of sunflower and safflower, with similar results.

We claim:

1. A method for making lightweight burned clay products by the stiff-mud extrusion process having substantially uniformly distributed and regularly oriented flat flake-like voids, comprising the steps of:
   (a) mixing together thoroughly ten parts by volume of solids consisting essentially of
      (1) six to eight parts by volume of mineral chosen from the group consisting of brick-making clay, brick-making shale, and mixtures thereof, and
      (2) four to two parts by volume of flakes of seed hulls chosen from the group consisting of sunflower seed hulls and safflower seed hulls and mixtures thereof,
   (b) mixing with said solids from about 15% to 25% by weight thereof of water to make a stiff mud,
   (c) extruding said stiff mud into a columnar shape having approximately the cross section of the clay products to be made, said extrusion serving to align said flakes in a regular attitude pattern,
   (d) cutting said column at intervals to form shaped blocks, and
   (e) drying and firing said blocks, thereby driving off the water and burning said hull flakes so that their space is replaced with flat flake-like voids.

2. The method of claim 1 wherein said water contains dissolved silicate of soda in the amount of one-half to two percent by weight of the water.

3. The method of claim 1 wherein said hull flakes lie in the six to thirty-five Tyler mesh range.

4. A method for making lightweight bricks by the stiff-mud extrusion process so as to provide uniform, well-shaped bricks having substantially uniformly distributed and regularly oriented flat flake-like voids, comprising the steps of:
   (a) mixing together thoroughly ten parts by volume of solids consisting essentially of
      (1) six to eight parts by volume of brick mineral chosen from the group consisting of brick-making clay, brick-making shale, and mixtures thereof, and
      (2) four to two parts by volume of flakes of safflower seed hulls,
   (b) mixing with said solids from about one-sixth to one-fourth by weight thereof of water to make a stiff mud,
   (c) extruding said stiff mud into a columnar shape having the cross section of the bricks to be made, said extrusion serving to align said safflower seed hull flakes in a regular attitude pattern,
   (d) cutting said column at intervals to form rectangular blocks, and
   (e) drying and firing said blocks into bricks, thereby driving off the water and burning said hull flakes so that their space is replaced with flat flake-like voids distributed substantially uniformly through said bricks.

5. A method for making, by the stiff-mud extrusion process lightweight bricks having substantially uniformly distributed and regularly oriented flat flake-like voids, comprising the steps of:
   (a) mixing together thoroughly ten parts by volume and weight of solids consisting essentially of
      (1) six to eight parts by volume of brick mineral chosen from the group consisting of brick-making clay, brick-making shale, and mixtures of said brick-making shale and clay, and
      (2) four to two parts by volume of safflower seed hull flakes of 6–35 Tyler mesh,
   (b) mixing with said solids from 15 to 25 parts by weight thereof of a one-half percent to two percent aqueous solution of sodium silicate, to make a stiff mud,
   (c) extruding said stiff mud into a columnar shape having approximately the cross section of the bricks to be made, said extrusion serving to align said flakes in a regular attitude pattern,
   (d) cutting said column at intervals to form rectangular blocks,
   (e) drying said blocks, thereby driving off the water therefrom, and
   (f) firing said blocks into bricks, thereby burning said hull flakes so that their space is replaced with flat flake-like voids distributed substantially uniformly through said bricks.

6. A method for making lightweight bricks by the stiff-mud extrusion process so as to provide uniform, well-shaped bricks having substantially uniformly distributed flat flake-like voids, comprising the steps of:
   (a) mixing together thoroughly ten parts by volume of solids consisting essentially of
      (1) six to eight parts by volume of brick mineral chosen from the group consisting of brick-making clay, brick-making shale, and mixtures thereof, and
      (2) four to two parts by volume of flakes of sunflower seed hulls,
   (b) mixing with said solids from about one-sixth to one-fourth by weight thereof of water to make a stiff mud,
   (c) extruding said stiff mud into a columnar shape having the cross section of the bricks to be made,
   (d) cutting said column at intervals to form rectangular blocks, and
   (e) drying and firing said blocks into bricks, thereby driving off the water and burning said hull flakes so that their space is replaced with flat flake-like voids distributed substantially uniformly through said bricks.

7. A method for making, by the stiff-mud extrusion process lightweight bricks having substantially uniformly distributed flat flake-like voids, comprising the steps of:
(a) mixing together thoroughly ten parts by volume and weight of solids consisting essentially of
   (1) six to eight parts by volume of brick mineral chosen from the group consisting of brick-making clay, brick-making shale, and mixtures of said brick-making shale and clay, and
   (2) four to two parts by volume of sunflower seed hull flakes of 6–35 Tyler mesh,
(b) mixing with said solids from 15 to 25 parts by weight thereof of a one-half percent to two percent aqueous solution of sodium silicate, to make a stiff mud,
(c) extruding said stiff mud into a columnar shape having approximately the cross section of the bricks to be made,
(d) cutting said column at intervals to form rectangular blocks,
(e) drying said blocks, thereby driving off the water therefrom, and
(f) firing said blocks into bricks, thereby burning said hull flakes so that their space is replaced with flat flake-like voids distributed substantially uniformly through said bricks.

References Cited by the Examiner
UNITED STATES PATENTS

| | | | |
|---|---|---|---|
| 1,345,666 | 7/1920 | Donavon | 106—41 |
| 2,050,225 | 8/1936 | Kohler | 264—44 |
| 2,243,219 | 5/1941 | Morgan | 106—41 XR |
| 2,543,987 | 3/1951 | Ramsay | 106—41 XR |
| 2,791,020 | 5/1957 | Heine | 264—44 |

ROBERT F. WHITE, *Primary Examiner.*

J. A. FINLAYSON, *Assistant Examiner.*